Oct. 12, 1971     D. D. McKAY ET AL     3,611,550
METHOD OF MAKING AN ELECTRICAL HEATING UNIT
Filed Oct. 10, 1969
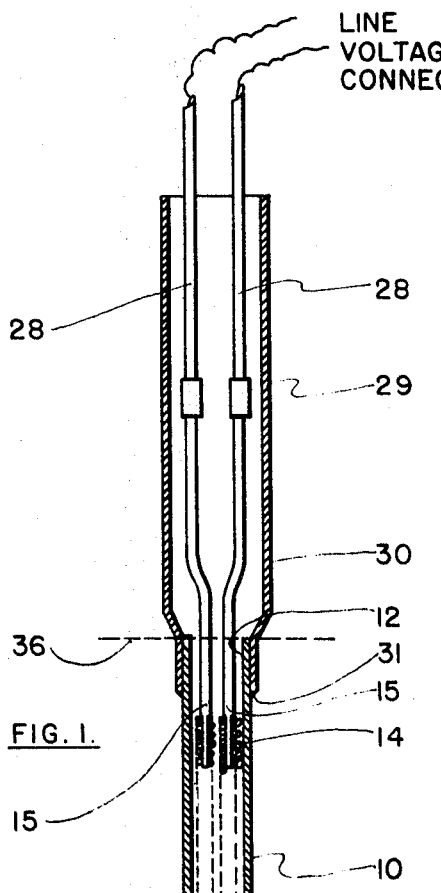
FIG. I.
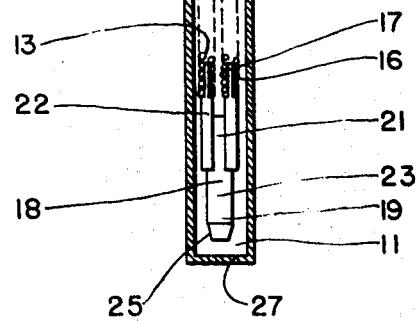
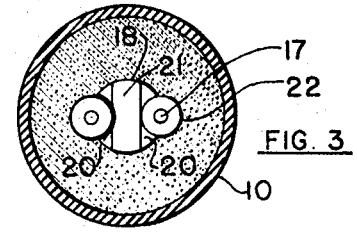
FIG. 3
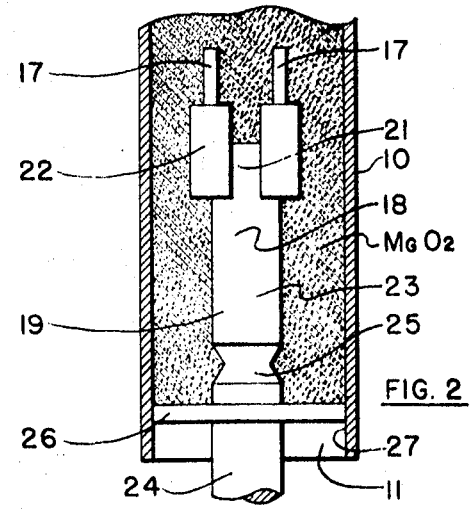
FIG. 2
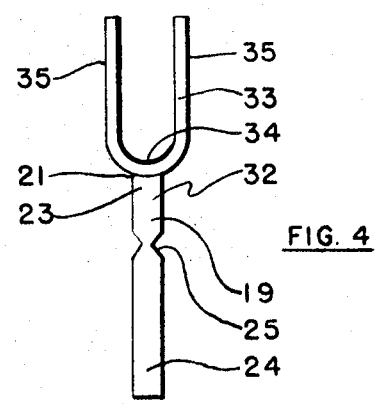
FIG. 4
INVENTORS:
DAVID. D. McKAY
ALBERT S GOULD
by
ATTORNEYS United States Patent Office 3,611,559
Patented Oct. 12, 1971

3,611,559
METHOD OF MAKING AN ELECTRICAL HEATING UNIT
David D. McKay and Albert S. Gould, Winnipeg, Manitoba, Canada, assignors to James B. Carter, Limited, Winnipeg, Manitoba, Canada
Filed Oct. 10, 1969, Ser. No. 865,312
Int. Cl. H06b 3/00
U.S. Cl. 29—611                                              1 Claim

ABSTRACT OF THE DISCLOSURE

A pair of parallel resistance elements are connected at one end thereof to a common junction member which electrically connects the elements in series, the junction member having an outer portion adapted to be broken off. The elements and the junction member are inserted in a tubular sheath and a washer is placed on the break-off portion of the junction member to hold it centralized in the sheath which is then filled with insulating material and is swaged to compact the insulation. The outer portion of the junction member is then broken off and is removed with the washer from the sheath. The end of the sheath is then sealed by a closure.

The invention relates to new and useful improvements in the manufacture of heating units, particularly so-called tubular heating units normally used for heating purposes ither by immersion into a liquid or by direct heat.

Conventional units consist of a metallic tubular sheath having a resistance element extending therethrough, said element being surrounded by powdered mineral insulating material which prevents the element from contacting the inner walls of the sheath.

The ends of the element normally extend from each end of the sheath which, after swaging to compact the mineral insulation, is then bent into a hairpin shape or a coil shape as desired and normally to bring the two ends of the sheath to a convenient location whereby the element may be connected to a source of electrical energy.

The principal disadvantage of the present construction is the difficulty of bending the element to bring the two ends together and the undesirability of having the two ends of the sheath together due to the difficulty of said ends being engaged within a circular aperture and sealed therein.

The present invention overcomes these disadvantages by providing a single tubular sheath having a pair of spaced and parallel resistance elements therewithin connected at the lower ends thereof by an electrically conducting junction. This construction permits the other two ends of the elements to be extended from one end of the sheath and thence to be connected to a source of electrical energy.

The principal object and essence of the invention is therefore to provide a method of construction which permits the connecting ends of a resistance element to be in side by side relationship within one end of a tubular sheath.

Another object of the invention is to provide a method of the character herewithin described which eliminates the necessity of hair-pinning the sheath to bring the terminal ends to adjacent positions.

A yet further object of the invention is to provide a method of the character herewithin described which permits the resistance element to be held centrally during the swaging operation and to be connected electrically internally of the sheath.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the figures in which:

FIG. 1 is a longitudinal section of the tubular heating unit after manufacture is completed.

FIG. 2 is an enlarged longitudinal sectional detail of the lower end of FIG. 1 but before manufacture is completed.

FIG. 3 is a top plan view of FIG. 2.

FIG. 4 is an alternative embodiment of the element holding junction per se.

In the drawings like characters of reference indicate corresponding parts in the different figures.

Proceeding to describe the invention in detail, reference character 10 illustrates a conventional tubular metallic sheath normally used for the construction of electrical elements.

This sheath which is basically cylindrical in configuration, is initially provided with a lower open end 11 and an upper open end 12.

A pair of electrical resistance elements in the form of wire coils 13 are spot welded by the upper ends 14 thereof, each to a terminal pin 15, said pins extending through the upper open end 12 of the sheath 10. The lower ends 16 of the resistance coils 13 are secured by spot welding to a terminal pin 17 forming part of an element holding junction collectively designated 18. FIG. 2 shows the preferred embodiment of this junction which consists of a cylindrical rod 19 having a pair of recessed and shouldered portions 20 formed on the upper end 21 thereof. Enlarged cylindrical portions 22 are formed as extensions of the terminal pins 17 and these enlarged portions are seated within the recessed and shouldered portions 20 of the rod 19 and are spot welded into position.

The aforementioned rod 19 extends through the open lower end 11 of the sheath 10 and this rod is divided into a fixed or attached portion 23 and a distal or removable portion 24 by an area of weakness 25 formed by reducing the diameter of the rod at the junction between the two portions.

The resistance elements 13 are spot welded to the terminal pins 15 and to the terminal pins 17. A crushable spacing washer 26 is engaged over the rod 19 so that when the assembly is entered into the sheath, the perimeter of the washer engages the inner wall 27 of the sheath thus maintaining the junction 18 and the resistance elements 13 concentrically within the sheath and spaced from the wall thereof.

The upper terminal pins 15 are easily fixed into position so that the elements 13 remain spaced from one another and spaced from the walls towards the upper ends of the sheath.

The sheath is then filled with powdered mineral insulating material of conventional type and the tubular sheath is then swaged to reduce the diameter thereof and to compact the insulating material around the resistance elements, and within the sheath. This is a conventional procedure and it is not believed necessary to describe same in further detail.

After the necessary compaction has been obtained, the distal portion 24 is snapped off from the fixed portion 23 around the area of weakness 25 and the washer 26, which has now been crushed by the swaging action, is removed together with the distal portion of the rod 24.

A sealing disc or end 27 is now silver soldered within the end 11 of the sheath. Flexible supply leads 28 are secured by conventional clips 29 to the upper ends of terminal pins 15 and a protecting sheath 30 is engaged over the upper end 12 of the sheath and silver soldered thereto as indicated at 31. The flexible supply leads 28 may be connected to line voltage in the normal manner and the source of electrical energy is not illustrated on the attached drawing.

FIG. 4 shows an alternative construction of the element holding junction and it should be stressed at this point that the element holding junction 18 shown in FIG. 2 and the element holding junction collectively designated 32, shown in FIG. 4 are both electrically conducting so that the ends 16 of the resistance elements 13 are electrically connected together by this junction.

The junction shown in FIG. 4 consists of a U-shaped terminal pin 33 secured by the base 34 thereof to the upper end of the fixed portion 23 of the rod 19 as by welding or similar means.

The two legs 35 of the U-shaped pin 33 form the terminal pins to which the lower ends 16 of the resistance elements 13 are secured.

Finally it will be noted that dotted line 36 in FIG. 1 indicates the approximate level of the powdered mineral insulation.

After the outer sheath 30 has been secured and the flexible leads 28 connected to the terminal pins 15, this upper sheath 30 may be potted with epoxy-resin to seal the element.

Various modifications can be made within the scope of the inventive concept which is herein disclosed and/or claimed.

What we claim as our invention is:

1. A method of making an electrical heating unit which includes a pair of coiled resistance elements disposed in spaced parallel relation within a tubular sheath and connected at one end thereof to a common junction member which electrically connects the elements in series, and wherein the junction member has an inner portion to which the elements are connected and an outer break-off portion frangibly joined to the inner portion; said method comprising the steps of:

(a) securing said elements at one end thereof to the inner portion of said junction member whereby the elements are electrically connected in series;

(b) inserting the elements and the junction member into a tubular sheath so that the break-off portion of the junction member projects outwardly from one end of the sheath;

(c) placing a washer on the break-off portion of the junction member so that the washer engages the sheath and holds the junction member centralized therein;

(d) filling the sheath with powdered insulating material to surround the elements and the inner portion of the junction member;

(e) swaging the sheath to reduce its diameter and compact the insulating material therein;

(f) breaking off the outer portion of the junction member and removing the broken-off portion with said washer thereon from the sheath; and (g) sealing the end of the sheath with a closure;

(h) the method being further characterized in that the breaking off of the junction member in step (f) eliminates any projection from the sheath through the closure installed in step (g) and leaves said inner portion of the junction member wholly within the sealed sheath to serially connect said elements.

References Cited

UNITED STATES PATENTS

| | | | |
|---|---|---|---|
| 2,632,833 | 3/1953 | Huck et al. | 338—261 X |
| 2,933,805 | 4/1960 | McOrlly | 29—611 |
| 3,087,134 | 4/1963 | McOrlly | 338—273 |
| 3,118,043 | 1/1964 | Bremer | 219—466 X |
| 2,897,467 | 7/1959 | Bremer | 29—615 X |
| 2,962,683 | 11/1960 | Jakubowski | 29—619 X |
| 3,468,023 | 9/1969 | McOrlly | 29—615 |

JOHN F. CAMPBELL, Primary Examiner

V. A. DiPALMA, Assistant Examiner

U.S. Cl. X.R.

29—611; 219—523, 544; 338—238